US012509150B2

(12) United States Patent
Meyer et al.

(10) Patent No.: US 12,509,150 B2
(45) Date of Patent: Dec. 30, 2025

(54) SYSTEMS AND METHODS FOR RACK FORCE EFFORT-BASED DAMPING FOR STEER-BY-WIRE STEERING SYSTEMS (71) Applicant: STEERING SOLUTIONS IP HOLDING CORPORATION, Saginaw, MI (US)

(72) Inventors: Jeffrey R. Meyer, Munger, MI (US); Joel E. Birsching, Vassar, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 19 days.

(21) Appl. No.: 18/627,577

(22) Filed: Apr. 5, 2024

(65) Prior Publication Data

US 2024/0336300 A1 Oct. 10, 2024

Related U.S. Application Data (60) Provisional application No. 63/457,921, filed on Apr. 7, 2023.

(51) Int. Cl.
*B62D 6/00* (2006.01)
*B62D 3/12* (2006.01)
*B62D 5/04* (2006.01)

(52) U.S. Cl.
CPC .............. *B62D 6/008* (2013.01); *B62D 3/12* (2013.01); *B62D 5/0472* (2013.01)

(58) Field of Classification Search
CPC ......... B62D 3/12; B62D 5/0472; B62D 6/008
See application file for complete search history.

(56) References Cited

FOREIGN PATENT DOCUMENTS

CN 115503812 A * 12/2022 ............ B62D 5/0466

OTHER PUBLICATIONS

Hou, S. CN-115503812-A. Machine translation. (Year: 2022).*

* cited by examiner

*Primary Examiner* — Mark L. Greene
(74) *Attorney, Agent, or Firm* — Dickinson Wright PLLC (57) ABSTRACT

A method for rack force effort-based damping includes: receiving a handwheel velocity signal associated with rotational motion of a handwheel of a vehicle; determining a vehicle speed; identifying, in a rack force look-up table, a rack force value based on the handwheel velocity signal and the vehicle speed; generating a modified rack force signal by adding the rack force value to a rack force signal; identifying, in an effort look-up table, an effort value based on the modified rack force signal; and selectively controlling at least one aspect of a steering system based on the effort value.

20 Claims, 6 Drawing Sheets

SYSTEMS AND METHODS FOR RACK FORCE EFFORT-BASED DAMPING FOR STEER-BY-WIRE STEERING SYSTEMS

CROSS-REFERENCES TO RELATED APPLICATIONS

This patent application claims priority to U.S. Provisional Patent Application Ser. No. 63/457,921 filed Apr. 7, 2023 which is incorporated herein by reference in its entirety.

TECHNICAL FIELD

This disclosure relates to vehicle steering systems and in particular to systems and methods for rack force effort-based damping for steer-by-wire vehicle steering systems.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

SUMMARY OF THE INVENTION

This disclosure relates generally to vehicle steering systems.

An aspect of the disclosed embodiments includes a method for rack force effort-based damping. The method includes receiving a handwheel velocity signal associated with rotational motion of a handwheel of a vehicle, determining a vehicle speed, and identifying a rack force value based on the handwheel velocity signal and the vehicle speed. The method also includes generating a modified rack force signal based on the rack force value and a rack force signal, identifying an effort value based on the modified rack force signal, and selectively controlling at least one aspect of a steering system based on the effort value.

An aspect of the disclosed embodiments includes a method for rack force effort-based damping. The method includes receiving a torque signal associated with a torque applied to a handwheel of a vehicle, determining a vehicle speed, and identifying a rack force value based on the torque signal and the vehicle speed. The method also includes generating a modified rack force signal based on the rack force value and a rack force signal, identifying an effort value based on the modified rack force signal, and selectively controlling at least one aspect of a steering system based on the effort value.

Another aspect of the disclosed embodiments includes a system for rack force effort-based damping. The system includes a processor, and a memory. The memory includes instructions that, when executed by the processor, cause the processor to: receive a handwheel velocity signal associated with rotational motion of a handwheel of a vehicle; determine a vehicle speed; identify a rack force value based on the handwheel velocity signal and the vehicle speed; generate a modified rack force signal based on the rack force value and a rack force signal; identify an effort value based on the modified rack force signal; and selectively control at least one aspect of a steering system based on the effort value.

Another aspect of the disclosed embodiments includes an apparatus for rack force effort-based damping. The apparatus includes a controller configured to: receive a handwheel velocity signal associated with a handwheel of a vehicle; determine a vehicle speed; identify, using a rack force look-up table, a rack force value based on the handwheel velocity signal and the vehicle speed; generate a modified rack force signal by adding the rack force value to a rack force signal; identify, using an effort look-up table, an effort value based on the modified rack force signal; and selectively control at least one aspect of a steering system based on the effort value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

Such steering systems may include various steering characteristics, such as assist steering characteristics, damping steering characteristics, effort steering characteristics, return steering characteristics, a road feedback steering characteristics, and/or the like. Typically, damping torque, associated with one or more damping steering characteristics, is generated using a two-dimensional lookup table that varies with vehicle speed. The output of such a table typically includes a handwheel torque command that is added to other commands used to generate a reference handwheel torque signal.

Figure 3:
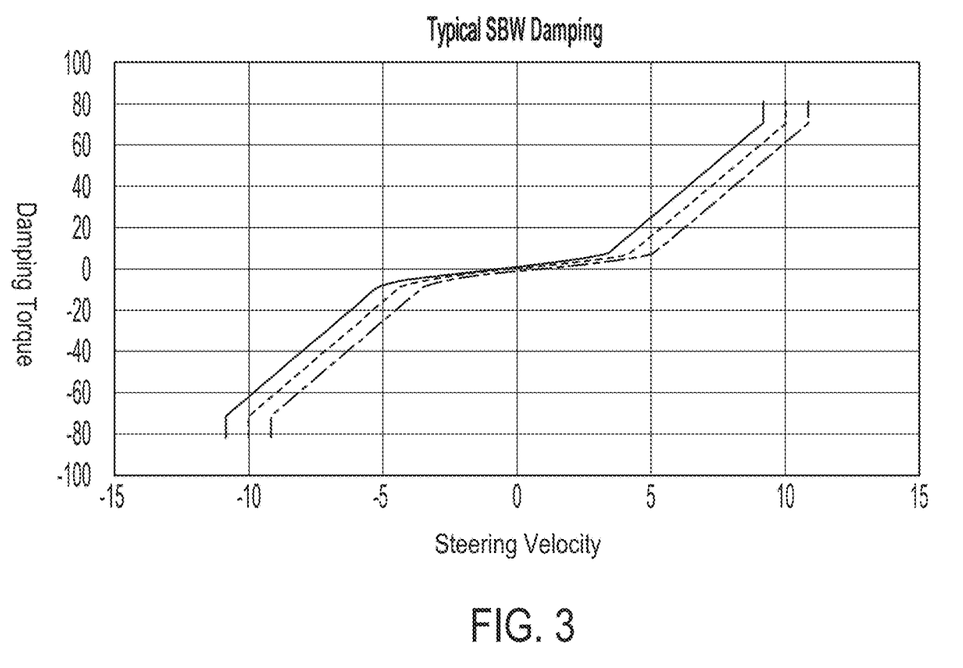
FIG. 3 generally illustrates a cooperative vehicle operation control system according to the principles of the present disclosure.
Figure 4:
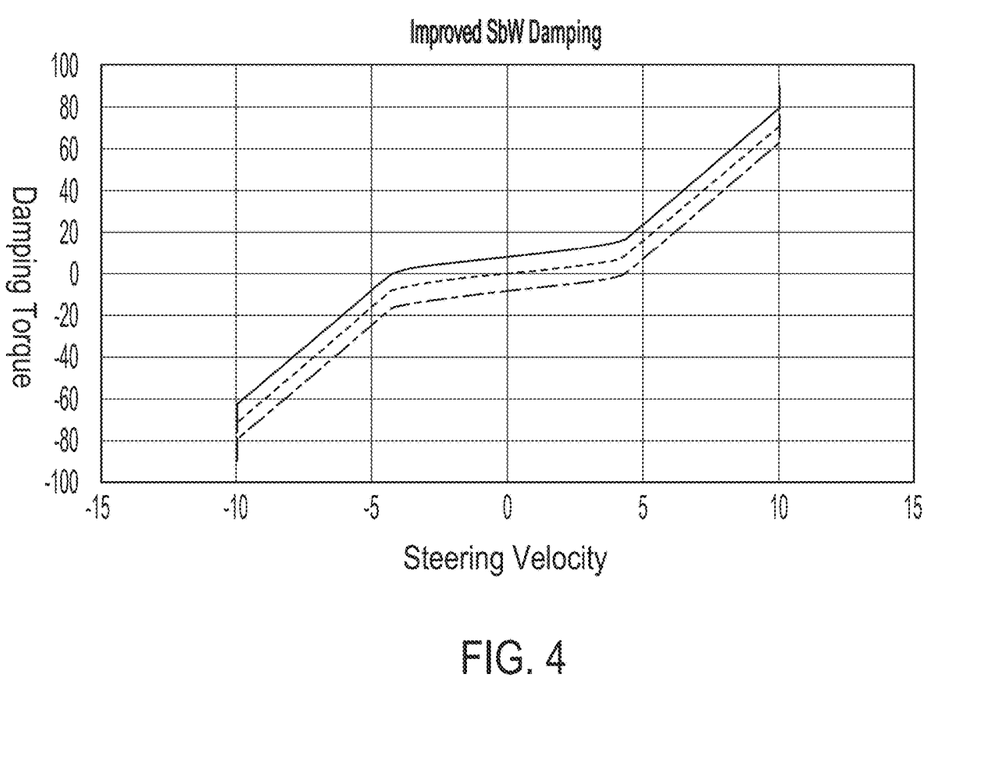
FIG. 4 generally illustrates a damping curve according to the principles of the present disclosure.

SbW steering systems typically use a lookup table to define how much damping torque to add to a base effort command, creating a shift along the torque axis (e.g., the horizontal axis, as is illustrated in FIG. 3 and FIG. 4) of an effort curve associated with an effort steering characteristic of the steering system. FIG. 3 generally illustrates an effort curve shape associated with typical damping systems in a SbW steering system. As is illustrated, a lack of damping is present in the on-center region.

Accordingly, systems and methods, such as those described herein, configured to provided improved steering system damping, may be desirable. In some embodiments, the systems and methods described herein may be configured to generate damping torque for a SbW handwheel actuator (HWA). The systems and methods described herein may be configured to generate a shift along the force axis (e.g., the vertical axis of, as is illustrated in FIG. 3 and FIG. 4) of the effort curve in order to create a damping effect, as is generally illustrated in FIG. 4.

The systems and methods described herein may be configured to use a two-dimensional lookup table that varies with vehicle speed, with the output of the table being a rack force value. The systems and methods described herein may be configured to send the new damping output to an effort function, instead of using the damping output as a command that gets combined with other commands to form a reference torque.

The systems and methods described herein may be configured to add the rack force value to a rack force signal. The systems and methods described herein may be configured to provide the sum of the rack force value and the rack force signal to an effort look-up table to create the shift along the force axis of the effort curve, increasing the effort function output. FIG. 4 generally illustrates an effort curve shape for a SbW steering system with the new damping output. As is illustrated, the damping is more uniform and damping in the on-center region is increased. This may result in improved (e.g., better) free-control performance and/or more consistent input impedance.

Figure 5:
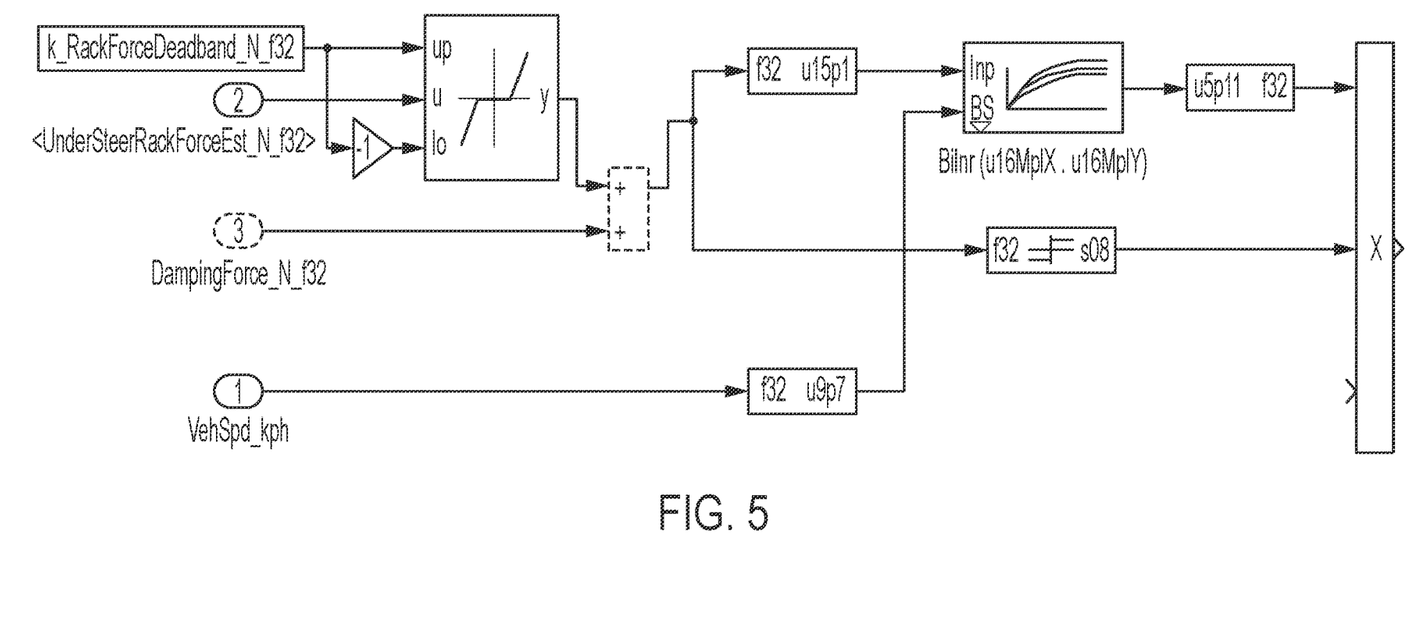
FIG. 5 generally illustrates an alternative damping curve according to the principles of the present disclosure.

FIG. 5 generally illustrates the effort function according to the principles of the present disclosure. The systems and methods described herein may be configured to omit the output of the damping function into the HWA torque reference command and to route the damping function into the effort function. The systems and methods described herein may be configured to change the output of the damping lookup table from handwheel Newton meters to rack Newtons.

In some embodiments, the systems and methods described herein may be configured to generate damping within the HWA. The systems and methods described herein may be configured to work in conjunction with the effort function to generate damping that is more effective and provides improved steering feel.

In some embodiments, the systems and methods described herein may be configured to receive a handwheel velocity signal associated with rotational motion of a handwheel of a vehicle. The systems and methods described herein may be configured to determine a vehicle speed. The systems and methods described herein may be configured to identify, in a rack force look-up table, a rack force value based on the handwheel velocity signal and the vehicle speed. The rack force look-up table may include a two-dimensional look-up table (e.g., or other suitable table) that includes a plurality of rack force values that correspond to respective handwheel velocity and varies with vehicle speed.

The systems and methods described herein may be configured to generate a modified rack force signal by adding the rack force value to a rack force signal. The systems and methods described herein may be configured to identify, in an effort look-up table, an effort value based on the modified rack force signal. The effort look-up table may include a two-dimensional look-up table (e.g., or other suitable table) that includes a plurality of effort values corresponding to respective rack force signals. The systems and methods described herein may be configured to selectively control at least one aspect of a steering system based on the effort value.

Figure 1:
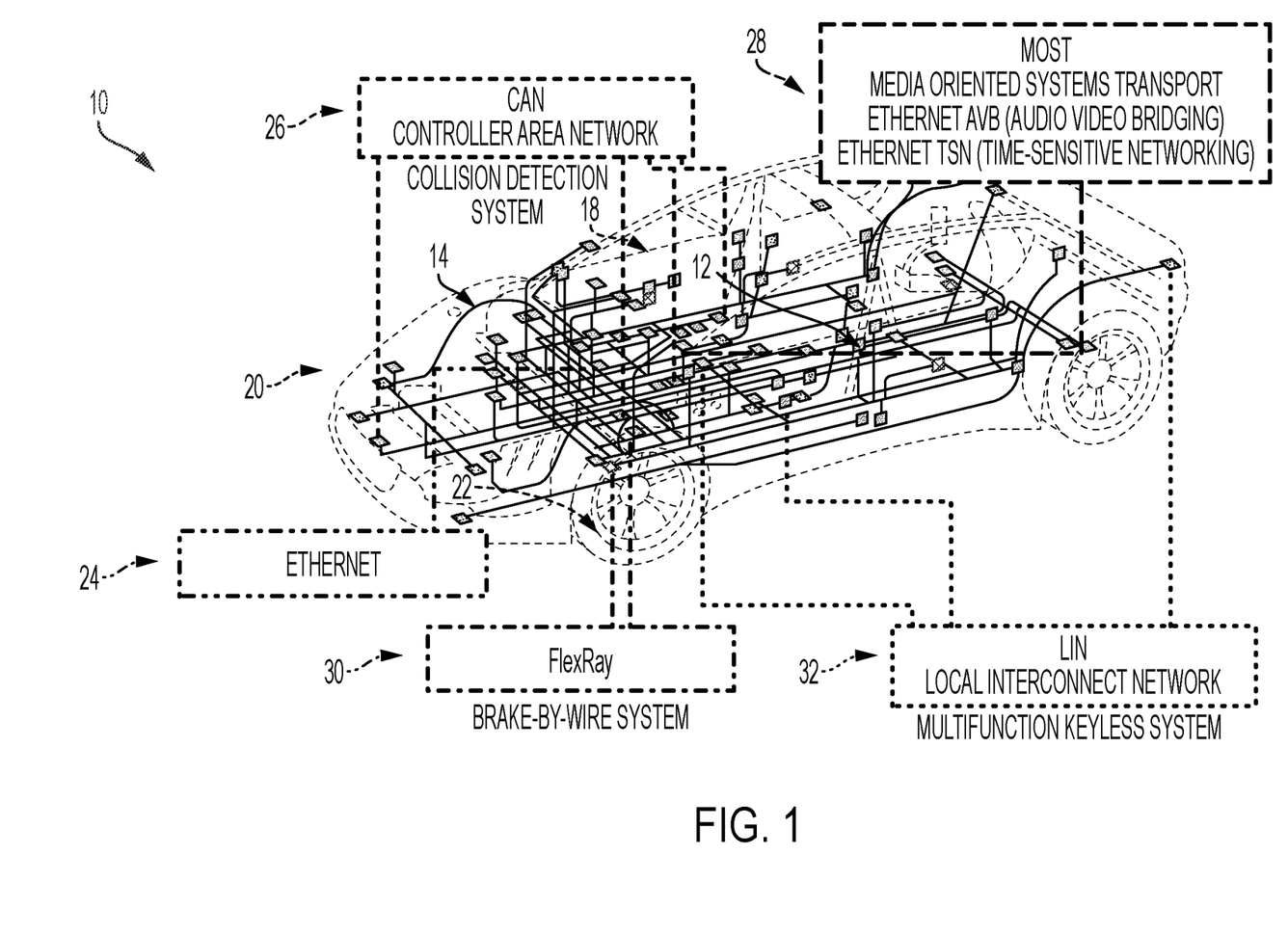
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
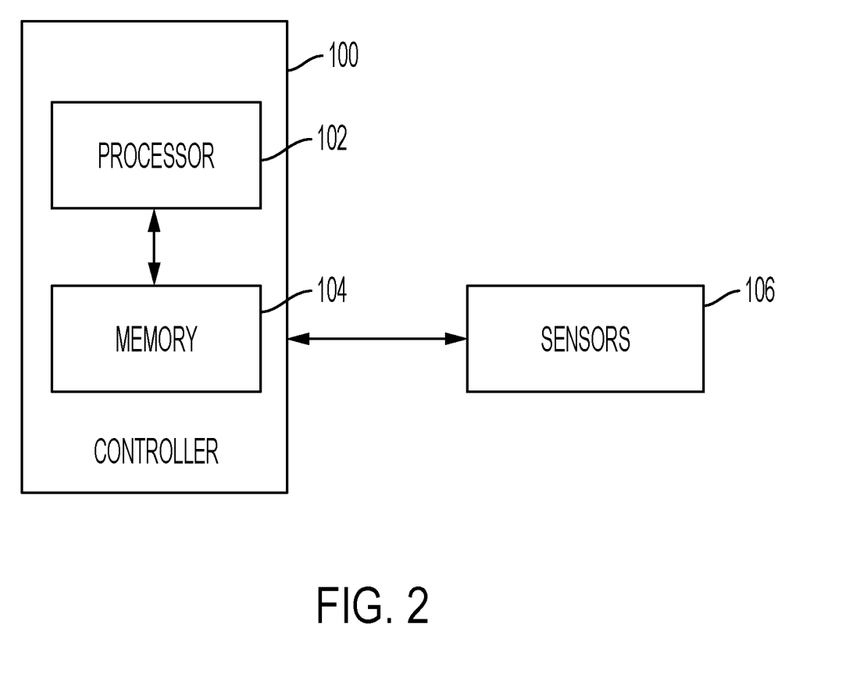
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to perform functions associated with the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

In some embodiments, controller 100 may be configured to provide rack force effort-based damping for the steering system of the vehicle 10. As described, the steering system may include a SbW steering system. The controller 100 may receive a torque signal associated with a torque applied to the handwheel of the vehicle 10. The controller 100 may determine a vehicle speed of the vehicle 10. The controller 100 may identify, in a rack force look-up table, a rack force value based on the torque signal and the vehicle speed. The rack force look-up table may include a two-dimensional look-up table (e.g., or other suitable table) that includes a plurality of rack force values that correspond to respective torque and varies with vehicle speed.

The controller 100 may generate a modified rack force signal by adding the rack force value to a rack force signal. The controller 100 may identify, in an effort look-up table, an effort value based on the modified rack force signal. The effort look-up table may include a two-dimensional look-up table (e.g., or other suitable table) that includes a plurality of effort values corresponding to respective rack force signals. The controller 100 may selectively control at least one aspect of the steering system based on the effort value.

In some embodiments, the controller 100 may receive a handwheel velocity signal associated with rotational motion of the handwheel of the vehicle 10. The controller 100 may determine a vehicle speed of the vehicle 10. The controller 100 may identify, in a rack force look-up table, a rack force value based on the handwheel velocity signal and the vehicle speed. The rack force look-up table may include a two-dimensional look-up table (e.g., or other suitable table) that includes a plurality of rack force values that correspond to respective handwheel velocity and varies with vehicle speed.

The controller 100 may generate a modified rack force signal by adding the rack force value to a rack force signal. The controller 100 may identify, in an effort look-up table, an effort value based on the modified rack force signal. The effort look-up table may include a two-dimensional look-up table (e.g., or other suitable table) that includes a plurality of effort values corresponding to respective rack force signals. The controller 100 may selectively control at least one aspect of the steering system based on the effort value.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 6:
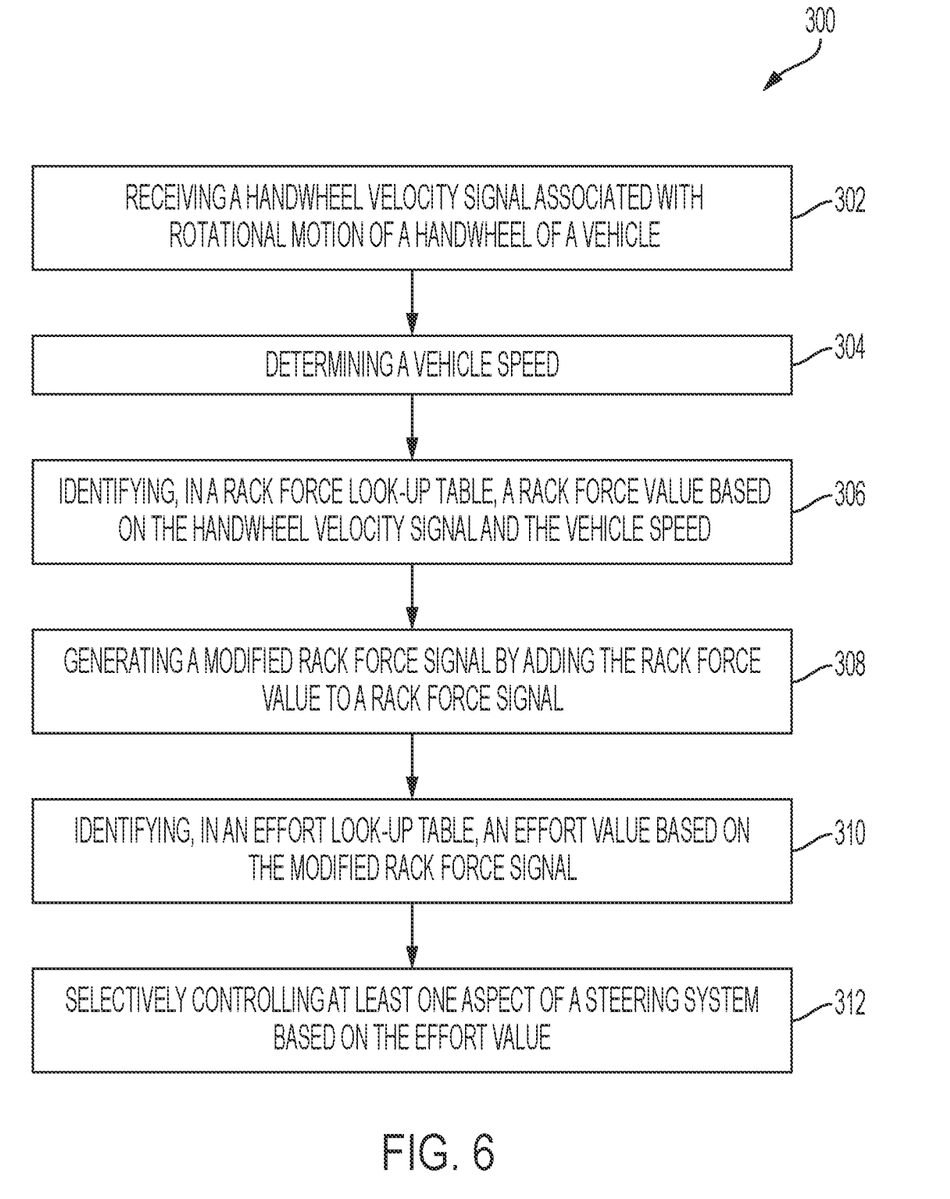
FIG. 6 is a flow diagram generally illustrating a rack force effort-based damping method according to the principles of the present disclosure.

FIG. 6 is a flow diagram generally illustrating a rack force effort-based damping method 300, according to the principles of the present disclosure. At 302, the method 300 receive a handwheel velocity signal associated with rotational motion of a handwheel of a vehicle. For example, the controller 100 may receive the handwheel velocity signal associated with the rotational motion of the handwheel of the vehicle 10.

At 304, the method 300 determines a vehicle speed. For example, the controller 100 may determine the vehicle speed of the vehicle 10.

At 306, the method 300 identifies, in a rack force look-up table, a rack force value based on the handwheel velocity signal and the vehicle speed. For example, the controller 100 may identify, in the rack force look-up table, the rack force value based on the handwheel velocity signal and the vehicle speed.

At 308, the method 300 generates a modified rack force signal by adding the rack force value to a rack force signal. For example, the controller 100 may generate the modified rack force signal by adding the rack force value to the rack force signal.

At 310, the method 300 identifies, in an effort look-up table, an effort value based on the modified rack force signal. For example, the controller 100 may identify, in the effort look-up table, the effort value based on the modified rack force signal.

At 312, the method 300 selectively controls at least one aspect of a steering system based on the effort value. For example, the controller 100 may selectively control the at least one aspect of the steering system based on the effort value.

In some embodiments, a method for rack force effort-based damping includes: receiving a handwheel velocity signal associated with rotational motion of a handwheel of a vehicle; determining a vehicle speed; identifying, in a rack force look-up table, a rack force value based on the handwheel velocity signal and the vehicle speed; generating a modified rack force signal by adding the rack force value to a rack force signal; identifying, in an effort look-up table, an effort value based on the modified rack force signal; and selectively controlling at least one aspect of a steering system based on the effort value.

In some embodiments, the rack force look-up table include a two-dimensional look-up table that includes a plurality of rack force values that correspond to respective handwheel velocity and varies with vehicle speed. In some embodiments, the effort look-up table includes a two-dimensional look-up table that includes a plurality of effort values corresponding to respective rack force signals.

In some embodiments, a system for rack force effort-based damping includes a processor, and a memory. The memory includes instructions that, when executed by the processor, cause the processor to: receive a handwheel velocity signal associated with rotational motion of a handwheel of a vehicle; determine a vehicle speed; identify, in a rack force look-up table, a rack force value based on the handwheel velocity signal and the vehicle speed; generate a modified rack force signal by adding the rack force value to a rack force signal; identify, in an effort look-up table, an effort value based on the modified rack force signal; and selectively control at least one aspect of a steering system based on the effort value.

In some embodiments, the rack force look-up table include a two-dimensional look-up table that includes a plurality of rack force values that correspond to respective handwheel velocity and varies with vehicle speed. In some embodiments, the effort look-up table includes a two-dimensional look-up table that includes a plurality of effort values corresponding to respective rack force signals.

In some embodiments, a method for rack force effort-based damping includes receiving a handwheel velocity signal associated with rotational motion of a handwheel of a vehicle, determining a vehicle speed, and identifying a rack force value based on the handwheel velocity signal and the vehicle speed. The method also includes generating a modified rack force signal based on the rack force value and a rack force signal, identifying an effort value based on the modified rack force signal, and selectively controlling at least one aspect of a steering system based on the effort value.

In some embodiments, identifying the rack force value based on the handwheel velocity signal and the vehicle speed includes using a rack force look-up table. In some embodiments, the rack force look-up table includes a two-dimensional look-up table. In some embodiments, the two-dimensional look-up table includes a plurality of rack force values that correspond to respective handwheel velocity and varies with vehicle speed. In some embodiments, identifying the effort value based on the modified rack force signal includes using an effort look-up table. In some embodiments, the effort look-up table includes a two-dimensional look-up table. In some embodiments, the two-dimensional look-up table includes a plurality of effort values corresponding to respective rack force signals. In some embodiments, generating the modified rack force signal based on the rack force value and the rack force signal includes adding the rack force value to the rack force signal.

In some embodiments, a system for rack force effort-based damping includes a processor, and a memory. The memory includes instructions that, when executed by the processor, cause the processor to: receive a handwheel velocity signal associated with rotational motion of a handwheel of a vehicle; determine a vehicle speed; identify a rack force value based on the handwheel velocity signal and the vehicle speed; generate a modified rack force signal based on the rack force value and a rack force signal; identify an effort value based on the modified rack force signal; and selectively control at least one aspect of a steering system based on the effort value.

In some embodiments, the instructions further cause the processor to identify the rack force value based on the handwheel velocity signal and the vehicle speed by using a rack force look-up table. In some embodiments, the rack force look-up table includes a two-dimensional look-up table. In some embodiments, the two-dimensional look-up table includes a plurality of rack force values that correspond to respective handwheel velocity and varies with vehicle speed. In some embodiments, the instructions further cause the processor to identify the effort value based on the modified rack force signal includes using an effort look-up table. In some embodiments, the effort look-up table includes a two-dimensional look-up table. In some embodiments, the two-dimensional look-up table includes a plurality of effort values corresponding to respective rack force signals. In some embodiments, the instructions further cause the processor to generate the modified rack force signal based on the rack force value and the rack force signal by adding the rack force value to the rack force signal.

In some embodiments, an apparatus for rack force effort-based damping includes a controller configured to: receive a handwheel velocity signal associated with a handwheel of a vehicle; determine a vehicle speed; identify, using a rack force look-up table, a rack force value based on the handwheel velocity signal and the vehicle speed; generate a modified rack force signal by adding the rack force value to a rack force signal; identify, using an effort look-up table, an effort value based on the modified rack force signal; and selectively control at least one aspect of a steering system based on the effort value.

In some embodiments, the rack force look-up table includes a two-dimensional look-up table. In some embodiments, the two-dimensional look-up table includes a plurality of rack force values that correspond to respective handwheel velocity and varies with vehicle speed. In some embodiments, the effort look-up table includes a two-dimensional look-up table.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for rack force effort-based damping, the method comprising:
receiving a handwheel velocity signal associated with rotational motion of a handwheel of a vehicle;
determining a vehicle speed;
identifying a rack force value based on the handwheel velocity signal and the vehicle speed;
generating a modified rack force signal based on the rack force value and a rack force signal;
identifying an effort value based on the modified rack force signal; and selectively controlling at least one aspect of a steering system based on the effort value.

2. The method of claim 1, wherein identifying the rack force value based on the handwheel velocity signal and the vehicle speed includes using a rack force look-up table.

3. The method of claim 2, wherein the rack force look-up table includes a two-dimensional look-up table.

4. The method of claim 3, wherein the two-dimensional look-up table includes a plurality of rack force values that correspond to respective handwheel velocity and varies with vehicle speed.

5. The method of claim 1, wherein identifying the effort value based on the modified rack force signal includes using an effort look-up table.

6. The method of claim 5, wherein the effort look-up table includes a two-dimensional look-up table.

7. The method of claim 6, wherein the two-dimensional look-up table includes a plurality of effort values corresponding to respective modified rack force signals.

8. The method of claim 1, wherein generating the modified rack force signal based on the rack force value and the rack force signal includes adding the rack force value to the rack force signal.

9. A system for rack force effort-based damping, the system comprising:
a processor; and
a memory including instructions that, when executed by the processor, cause the processor to:
receive a handwheel velocity signal associated with rotational motion of a handwheel of a vehicle;
determine a vehicle speed;
identify a rack force value based on the handwheel velocity signal and the vehicle speed;
generate a modified rack force signal based on the rack force value and a rack force signal;
identify an effort value based on the modified rack force signal; and
selectively control at least one aspect of a steering system based on the effort value.

10. The system of claim 9, wherein the instructions further cause the processor to identify the rack force value based on the handwheel velocity signal and the vehicle speed by using a rack force look-up table.

11. The system of claim 10, wherein the rack force look-up table includes a two-dimensional look-up table.

12. The system of claim 11, wherein the two-dimensional look-up table includes a plurality of rack force values that correspond to respective handwheel velocity and varies with vehicle speed.

13. The system of claim 9, wherein the instructions further cause the processor to identify the effort value based on the modified rack force signal includes using an effort look-up table.

14. The system of claim 13, wherein the effort look-up table includes a two-dimensional look-up table.

15. The system of claim 14, wherein the two-dimensional look-up table includes a plurality of effort values corresponding to respective modified rack force signals.

16. The system of claim 9, wherein the instructions further cause the processor to generate the modified rack force signal based on the rack force value and the rack force signal by adding the rack force value to the rack force signal.

17. An apparatus for rack force effort-based damping, the apparatus comprising:
a controller configured to:
receive a handwheel velocity signal associated with a handwheel of a vehicle;
determine a vehicle speed;
identify, using a rack force look-up table, a rack force value based on the handwheel velocity signal and the vehicle speed;
generate a modified rack force signal by adding the rack force value to a rack force signal;
identify, using an effort look-up table, an effort value based on the modified rack force signal; and
selectively control at least one aspect of a steering system based on the effort value.

18. The apparatus of claim 17, wherein the rack force look-up table includes a two-dimensional look-up table.

19. The apparatus of claim 18, wherein the two-dimensional look-up table includes a plurality of rack force values that correspond to respective handwheel velocity and varies with vehicle speed.

20. The apparatus of claim 17, wherein the effort look-up table includes a two-dimensional look-up table.

* * * * *